(12) United States Patent
Boyer

(10) Patent No.: US 10,336,007 B2
(45) Date of Patent: Jul. 2, 2019

(54) SENSOR FUSION FOR POWDER BED MANUFACTURING PROCESS CONTROL

(71) Applicant: United Technologies Corporation, Hartford, CT (US)

(72) Inventor: Jesse R. Boyer, Middletown, CT (US)

(73) Assignee: United Technologies Corporation, Farmington, CT (US)

(*) Notice: Subject to any disclaimer, the term of this patent is extended or adjusted under 35 U.S.C. 154(b) by 920 days.

(21) Appl. No.: 14/632,857

(22) Filed: Feb. 26, 2015

(65) Prior Publication Data

US 2015/0321422 A1 Nov. 12, 2015

Related U.S. Application Data (60) Provisional application No. 61/991,041, filed on May 9, 2014.

(51) Int. Cl.
*B22F 3/10* (2006.01)
*B33Y 10/00* (2015.01)
(Continued)

(52) U.S. Cl.
CPC ........ *B29C 67/0077* (2013.01); *B22F 3/1055* (2013.01); *B29C 64/153* (2017.08);
(Continued)

(58) Field of Classification Search
CPC ..... B29C 64/386; B29C 64/153; B33Y 10/00; B33Y 50/02; B33Y 30/00; B22F 3/1055;
(Continued)

(56) References Cited

U.S. PATENT DOCUMENTS 6,580,959 B1   6/2003 Mazumder
9,724,876 B2 * 8/2017 Cheverton ............ B29C 64/386
(Continued)

FOREIGN PATENT DOCUMENTS

EP   1815936 A1   8/2007
WO   200000921 A1  1/2000

OTHER PUBLICATIONS

The European Search Report dated Oct. 5, 20105 for European Application No. 15167213.6.
(Continued)

*Primary Examiner* — Keith Walker
*Assistant Examiner* — John A Hevey
(74) *Attorney, Agent, or Firm* — Kinney & Lange, P.A.

(57) ABSTRACT

A system for additive manufacturing a component includes an additive manufacturing machine for building a component layer by layer and a first sensor configured to collect a first physical property data for each layer of the component as each layer is formed by the additive manufacturing machine. The system also includes a second sensor configured to collect a second physical property data for each layer of the component as each layer is formed by the additive manufacturing machine. A computing device is operatively connected to the first and second sensors and configured to receive the first physical property data and the second physical property data of the component and configured to compare the first physical property data with the second physical property data to determine a potential failure mode in the component.

12 Claims, 3 Drawing Sheets

(51) Int. Cl.
  *B33Y 50/02* (2015.01)
  *B29C 64/153* (2017.01)
  *B29C 64/386* (2017.01)
  *B33Y 30/00* (2015.01)
  *B22F 3/105* (2006.01)
  *B29C 67/00* (2017.01)

(52) U.S. Cl.
  CPC ............ *B29C 64/386* (2017.08); *B33Y 10/00* (2014.12); *B33Y 50/02* (2014.12); *B22F 2003/1056* (2013.01); *B22F 2003/1057* (2013.01); *B22F 2203/03* (2013.01); *B22F 2999/00* (2013.01); *B33Y 30/00* (2014.12); *Y02P 10/295* (2015.11)

(58) Field of Classification Search
  CPC ...... B22F 2003/1057; B22F 2003/1056; Y02P 10/295
  See application file for complete search history.

(56) References Cited

U.S. PATENT DOCUMENTS

| | | | |
|---|---|---|---|
| 9,943,933 B2* | 4/2018 | Xu | F01D 5/005 |
| 2005/0288813 A1* | 12/2005 | Yang | B22F 3/1055 |
| | | | 700/119 |
| 2014/0163717 A1* | 6/2014 | Das | B22F 3/1055 |
| | | | 700/119 |

OTHER PUBLICATIONS

Jack Beuth, Process Mapping for Qualifications Across Multiple Direct Metal Additive Manufacturing Process, 11 pages, Department of Mechanical Engineering, Carnegie Mellon University, Pittsburgh, PA.

* cited by examiner

SENSOR FUSION FOR POWDER BED MANUFACTURING PROCESS CONTROL

CROSS-REFERENCE TO RELATED APPLICATION(S)

This application claims priority from U.S. Provisional Application No. 61/991,041, filed May 9, 2014 for "Sensor Fusion For Powder Bed Manufacturing Process" by Jesse R. Boyer.

BACKGROUND

The present invention relates to additive manufactured parts and more specifically to predicting potential failure modes in additive manufactured parts.

Additive manufacturing is a process in which three-dimensional parts are formed on a layer-by-layer basis. Additive manufacturing can be used in place of other manufacturing methods like casting, forging and machining. Additive manufacturing can also be used to form parts having fine geometric features that are difficult to produce by the other methods described above.

In some additive manufacturing methods, beds of powder are used to create the layers of a part. A first powder bed is deposited according to a three-dimensional model and a heat source melts at least a portion of the first powder bed to form a starting layer of the part. The heat source can be a laser or an electron beam. An additional powder bed is then deposited on the first powder bed and the heat source melts a portion of the additional powder bed to form an additional layer of the part that is joined with the starting layer of the part. This process is continued on a layer-by-layer basis until the final part geometry is achieved.

The beds of powder and the part generated from the beds of powder are typically housed within a sealed chamber with a controlled atmosphere during the additive manufacturing process to reduce oxidation in the beds of powder. Because the additive manufacturing process typically occurs within a sealed chamber, monitoring the part for possible defects as the part is manufactured is difficult as there is limited space and access within the sealed chamber for sensors. Furthermore, the part is substantially covered by the beds of powder throughout the manufacturing process, obstructing the part from visual inspection as the part is manufactured.

SUMMARY

In one aspect, a method for additive manufacturing a component includes forming a first layer of the component by sintering at least a portion of a first bed of metal powder and collecting first physical property data of the first layer with a first sensor. Second physical property data of the first layer is collected with a second sensor. The method also includes forming a second layer of the component by sintering at least a portion of a second bed of metal powder disposed proximate the first layer. First physical property data of the second layer is collected with the first sensor and second physical property data of the second layer is collected with the second sensor. The method further includes aggregating the first physical property data of the first layer and the second layer of the component, and aggregating the second physical property data of the first layer and the second layer of the component. A model is calculated based on the aggregated first physical property data and the aggregated second physical property data from which to determine a potential failure mode in the component.

In another aspect, a system for additive manufacturing a component includes an additive manufacturing machine for building a component layer by layer and a first sensor configured to collect a first physical property data for each layer of the component as each layer is formed by the additive manufacturing machine. The system also includes a second sensor configured to collect a second physical property data for each layer of the component as each layer is formed by the additive manufacturing machine. A computing device is operatively connected to the first and second sensors and configured to receive the first physical property data and the second physical property data of the component and configured to compare the first physical property data with the second physical property data to determine a potential failure mode in the component.

In another aspect, a method for additive manufacturing a component includes forming a first layer of the component by an additive manufacturing machine and collecting first physical property data of the first layer with a first sensor. Second physical property data of the first layer is collected with a second sensor. The first physical property data of the first layer and the second physical property data of the first layer are compared to inspect the first layer for a defect. The method further comprises forming a second layer of the component by the additive manufacturing machine and collecting first physical property data of the second layer with the first sensor. Second physical property data of the second layer is collected with the second sensor. The first physical property data of the second layer and the second physical property data of the second layer are compared to inspect the second layer for a defect. The first physical property data and the second physical property data of the first layer is aggregated with the first physical property data and the second physical property data of the second layer to form a model of the first physical property and the second physical property of the component. A potential failure mode in the component is determined based upon the model of the first physical property and the second physical property of the component.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

In at least some embodiments, the present invention relates generally to a system and method for additive manufacturing a component and determining a potential failure mode in the component. The present system and method includes an additive manufacturing machine with a plurality of sensors for collecting multiple kinds of physical property data of each layer of the component as each layer is formed by the additive manufacturing machine. A computing device aggregates and compares the multiple kinds of physical property data to generate a model of a potential failure mode in the component. Persons of ordinary skill in the art will recognize additional features and benefits in view of the entirety of the present disclosure, including the accompanying figures.

Figure 1A:
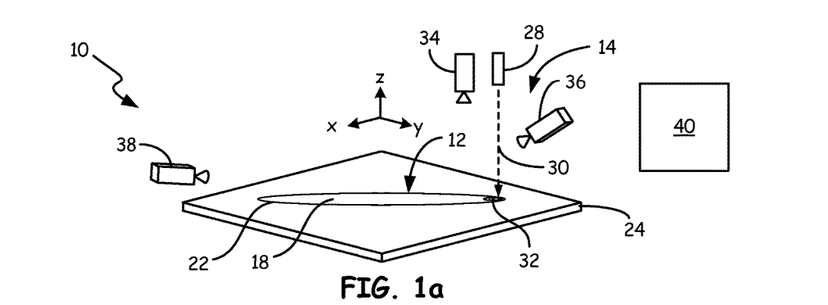
FIG. 1A depicts a schematic view of an additive manufacturing system with a plurality of sensors, the additive manufacturing system working a first layer of a powder bed.
Figure 1B:
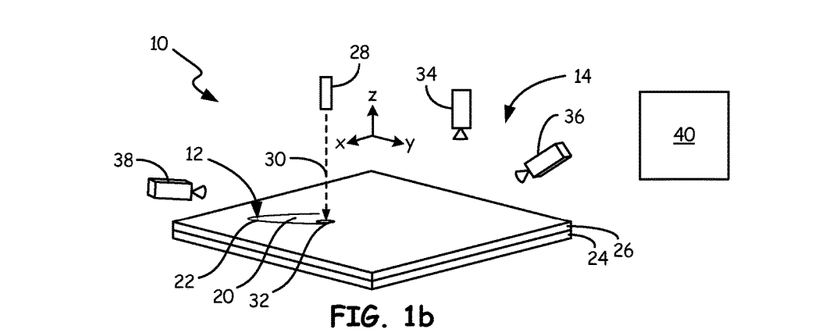
FIG. 1B depicts another schematic view of the additive manufacturing system of FIG. 1A working a second layer of a powder bed.
Figure 1C:
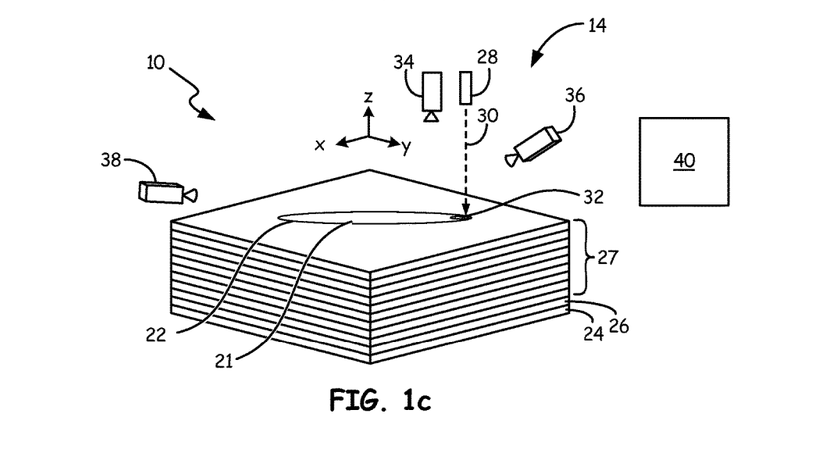
FIG. 1C depicts another schematic view of the additive manufacturing system of FIG. 1A working a subsequent layer of a powder bed.

FIGS. 1A-1C will be discussed concurrently. FIGS. 1A-1C depict a schematic view of system and method 10 for manufacturing component 12 with additive manufacturing machine 14. As shown in FIGS. 1A-1C, component 12 can include first layer 18, second layer 20, subsequent layers 21, and sintered metal 22. Additive manufacturing machine 14 can include first bed 24 of metal powder, second bed 26 of metal powder, heat source 28 with beam 30 for forming melt pool 32, first sensor 34, second sensor 36, third sensor 38, and computing device 40.

As shown in FIG. 1A, additive manufacturing machine 14 can begin manufacturing component 12 by depositing first bed 24 of metal powder. Once additive manufacturing machine 14 has deposited first bed 24, beam 30 of heat source 28 engages first bed 24 and melts a portion of the metal powder in first bed 24, thereby forming melt pool 32. Beam 30 of heat source 28 and melt pool 32 progress across first bed 24 to form sintered metal 22 of first layer 18 of component 12. Additive manufacturing machine 14 can be a direct metal laser sintering machine and heat source 28 can be a laser. Alternatively, additive manufacturing machine 14 can be an electron beam sintering machine and heat source 28 can be an electron beam emitter.

As heat source 28 melts and sinters portions of first bed 24 to form first layer 18 of component 12, first sensor 34 collects first physical property data of first layer 18, second sensor 36 collects second physical property data of first layer 18, and third sensor 38 collects third physical property data of first layer 18. The position of first sensor 34, second sensor 36, and third sensor 38 can be fixed relative first bed 24 and heat source 28 can be configured to move across first bed 24. Alternatively, heat source 28 can be fixed and mirrors can be used to move beam 30 across first bed 24. Computing device 40 is operatively connected to first sensor 34, second sensor 36, and third sensor 38 and is configured to receive the first, second, and third physical property data of first layer 18 of component 12. As discussed in greater detail with reference to FIG. 2, computing device 40 is also configured to compare the first physical property data, the second physical property data, and the third physical property data with each other to determine a potential failure mode in component 12.

Once first layer 18 of component 12 has been formed, heat source 28 is deactivated, first bed 24 is incrementally lowered, and additive manufacturing machine 14 deposits second bed 26 of metal powder on top of first bed 24 and first layer 18. After additive manufacturing machine 14 has deposited second bed 26 on top of first bed 24 and first layer 18, heat source 28 is activated and engages second bed 26 to form second layer 20 of component 12, as shown in FIG. 1B. As heat source 28 forms second layer 20 of component 12 in second bed 26, first sensor 34 collects the first physical property data of second layer 20, second sensor 36 collects the second physical property data of second layer 20, and third sensor 38 collects the third physical property data of second layer 20, and computing device 40 receives the first, second, and third physical property data. After source 28 has completed forming second layer 20 of component 12 in second bed 26, additive manufacturing machine 14 can incrementally lower first bed 24 and second bed 26 so that additional beds 27 of metal powder and subsequent layers 21 of component 12 can be formed, as shown in FIG. 1C. First sensor 34, second sensor 36, and third sensor 38 continue to collect first physical property data, second physical property data, and third physical property data respectively with each additional layer added to component 12 by additive manufacturing machine 14. As discussed below with reference to FIG. 2, computing device 40 can use first, second, and third physical property data of all of the layers of component 12 to generate model 16 to determine a possible failure mode of component 12.

Figure 2:
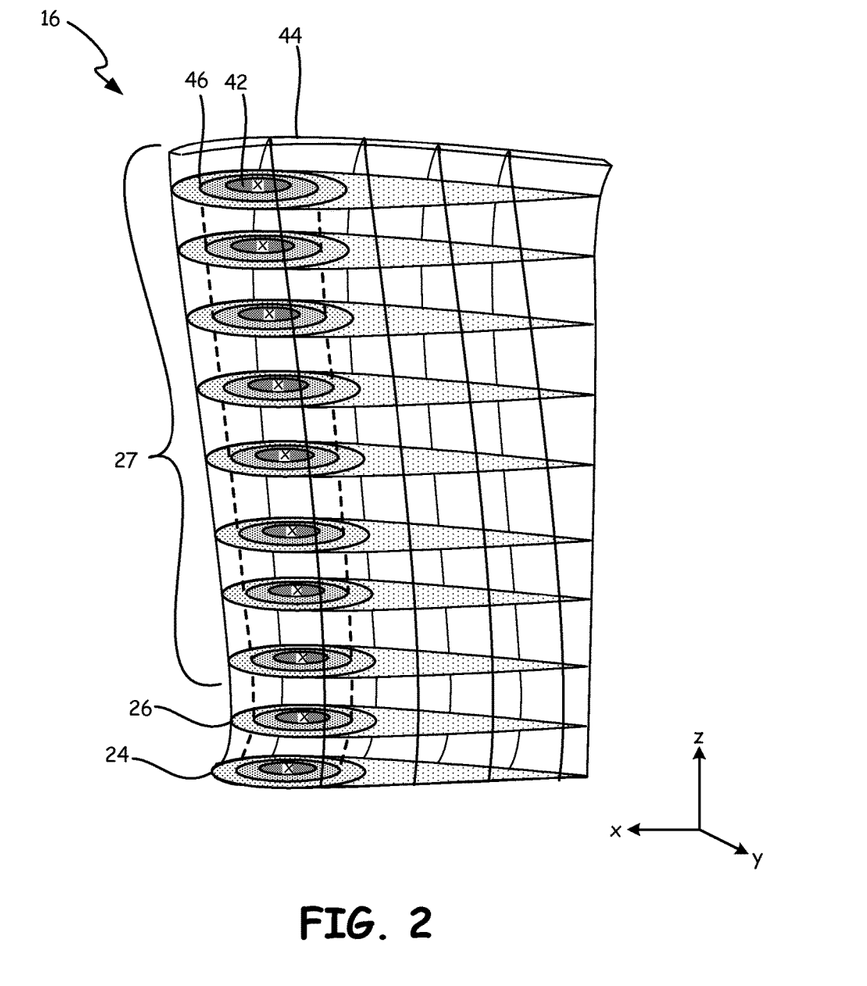
FIG. 2 depicts an isometric view of a model generated by the plurality of sensors of the additive manufacturing system of FIG. 1A of a first physical property and a second physical property of a component formed by the additive manufacturing system of FIG. 1A.

FIG. 2 depicts an isometric view of model 16 of component 12 calculated by computing device 40 based upon the first, second, and third physical property data collected by first sensor 34, second sensor 36, and third sensor 38 respectively from each of the layers of component 12. To improve the likelihood of determining a specific type of failure mode of component 12 through model 16, first sensor 34, second sensor 36, and third sensor 38 can be different kinds of sensors and can be selected such that the first physical property data, the second physical property data, and the third property data share interdependencies and can be analyzed together to determine the specific type of failure mode in component 12. First sensor 34, second sensor 36, and third sensor 38 can be selected from the group of sensors including high speed cameras, grayscale optical cameras, thermal cameras, fluid flow detectors, gas analyzers, ultrasonic emitters, and ultrasonic receivers. For example, as shown in FIG. 2, first sensor 34 can be a high speed camera and the first physical property data collected by first sensor 34 can be an intensity of heat source 28 as it formed each layer of component 12. Second sensor 36 can be a grayscale optical camera and the second physical property data collected by second sensor 36 can include a geometry of sintered metal 22 created by beam 30 as each layer was formed. Third sensor 36 can be a thermal camera and the third physical property data can include a thermal gradient of each layer that indicates a size and shape of melt pool 32 formed by beam 30 as it moved across each bed to form each layer of component 12.

In this specific example, the first physical property data containing the intensity of heat source 28 collected by first sensor 34 for each layer can be aggregated by computing device 40 and used to calculate a submodel of the location of low intensity spots 42 within component 12 where the intensity of heat source 28 was low or uneven, thereby possibly creating pockets of unsintered metal powder or partially unsintered metal powder within component 12. The second physical property data containing the geometry of sintered metal 22 collected by second sensor 36 for each layer can be aggregated by computing device 40 and used to calculate a submodel of the physical three-dimensional geometry 44 of component 12. The third physical property data containing the size and shape of melt pool 32 collected by third sensor 38 for each of layer can be aggregated by computing device 40 to calculate a submodel of the size and location of thermal cold spots 46 within component 12. In this example, computing device 40 can overlay or aggregate the three submodels to generate model 16 and determine the interdependencies between the first physical property data, the second physical property data, and the third physical property data. As illustrated in FIG. 2, physical three-dimensional geometry 44 from the second physical property data forms an outline of model 16 of component 12, and low intensity spots 42 from the first physical property data and thermal cold spots 46 from the third physical property data can overlap one another within geometry 44 of component 12 to indicate the position and size of potential voids or cracks within component 12.

In other examples not illustrated in FIG. 2, second sensor 36 or third sensor 38 can be a fluid flow detector and the second physical property data can comprise pressure differentials of a gas flow over first bed 24 of metal powder and second bed 26 of metal powder. Gas flow can be passed over first bed 24 and second bed 26 during the manufacture of component 12 to remove airborne particulate that might interfere with heat source 28 and reduce its intensity. Based on the pressure differentials of the gas flow over first bed 24 and second bed 26 in the second physical property data, computing device 40 can determine a presence of airborne particulate over first bed 24 and second bed 26 during the manufacture of component 12.

In other examples not illustrated in FIG. 2, second sensor 36 or third sensor 38 can include an ultrasonic emitter and an ultrasonic receiver and the second physical property data can include a density of first bed 24 of metal powder and a density of second bed 26 of metal powder. The density of first bed 24 and second bed 26 in the second physical property data can be used by computing device 40 to detect the presence of cracks, the propagation of cracks, or combinations thereof in component 12.

In addition to determining the presence of a potential failure mode in component 12, first sensor 34, second sensor 36, and third sensor 38 can be used by additive manufacturing machine 14 to reduce the likelihood of failure modes propagating throughout component 12. Before first layer 18 of component 12 is formed by additive manufacturing machine 14, an operator can input at least one control parameter into additive manufacturing machine 14. The at least one control parameter can be selected from the group including laser power of additive manufacturing machine 14, electron beam power of additive manufacturing machine 14, powder grain size distribution of first bed 24 of metal powder, powder chemistry of first bed 24, gas flow across a surface of first bed 24, purity of the gas flow, speed of the laser of additive manufacturing machine 14, speed of the electron beam of additive manufacturing machine 14, and combinations thereof. As additive manufacturing machine 14 forms first layer 18, and as computing device 40 receives the first, second, and third physical property data from first sensor 34, second sensor 36, and third sensor 38 respectively, computing device 40 can compare the first, second and third physical property data of the first with each other to inspect first layer 18 for a defect. If computing device 40 finds a defect in first layer 18, computing device 40 can adjust the at least one control parameter prior to completing first layer 18 and before forming second layer 20 so as to correct the defect in first layer 18 and prevent the defect from forming in second layer 20. Once computing device 40 has adjusted the at least one control parameter, additive manufacturing machine 14 can proceed with forming second layer 20 of component 12.

Figure 3:
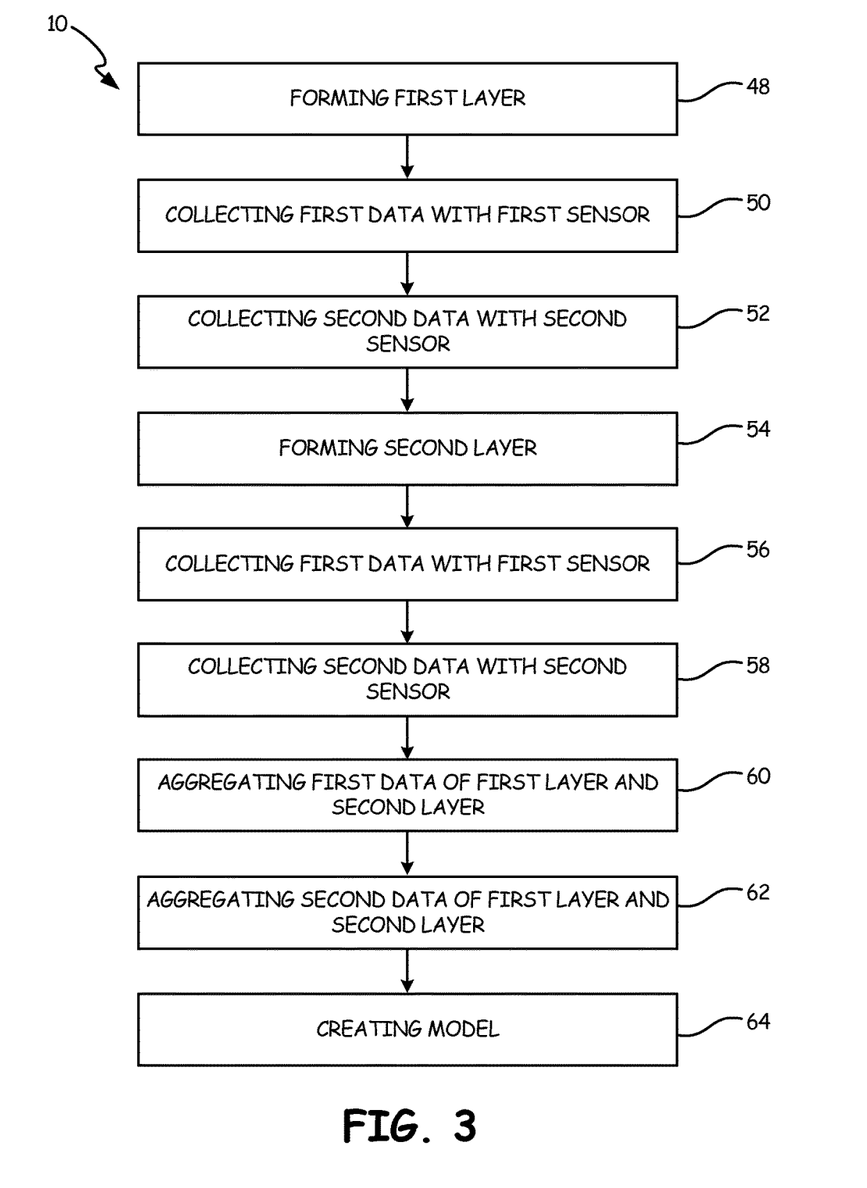
FIG. 3 depicts a flow chart of a method for forming the three-dimensional model of FIG. 2.

FIG. 3 depicts a flow chart of method 10 for forming model 16 of component 12. Method 10 can include the steps of: forming first layer 18 of component 12 by sintering at least a portion of first bed 24 of metal powder [step 48]; collecting first physical property data of first layer 18 with first sensor 34 [step 50]; and collecting second physical property data of first layer 18 second sensor 36 [step 52]. Method 10 can also include: forming second layer 20 of component 12 by sintering at least a portion of second bed 26 of metal powder disposed proximate first layer 18 [step 54]; collecting the first physical property data of second layer 20 with first sensor 34 [step 56]; and collecting second physical property data of second layer 20 with second sensor 36 [step 58]. Method 10 can further include: aggregating the first physical property data of first layer 18 and second layer 20 of component 12 [step 60]; and aggregating the second physical property data of first layer 18 and second layer 20 of component 12 [step 62]. Finally, model 10 can be calculated based on the aggregated first physical property data and the aggregated second physical property data from which to determine a potential failure mode in component 12 [step 64]. While the invention has been described above with reference to the embodiments disclosed in FIGS. 1A-3, other configurations and arrangements can be used in alternative embodiments.

Persons of ordinary skill in the art will recognize that system and method 10 can provide numerous advantages and benefits. Some examples of those advantages and benefits are as follows. Based on the first, second, and third physical property data collected by first sensor 34, second sensor 36, and third sensor 38 respectively, computing device 40 can calculate model 16 of component 12 formed by additive manufacturing machine 14. Model 16 allows an operator to determine the existence of a potential failure mode in component 12, such as an interior void or crack, which may not be easily detected through visual inspection of the component. Because model 16 allows an operator to determine the existence of a potential failure mode in component 12, the operator can perform further steps to repair or remedy the failure mode in component 12 before component 12 enters operation. First sensor 34, second sensor 36, and third sensor 38 of system and method 10 can also be used to analyze each layer of component 12 as each layer is being formed by additive manufacturing machine 14. Should first sensor 34, second sensor 36, and third sensor 38 sense a defect in a layer of component 12, computing device 40 can adjust at least one control parameter of additive manufacturing machine 14 so as to correct the defect in the layer and reduce the likelihood of the defect propagating in subsequent layers of component 12.

The following are non-exclusive descriptions of possible embodiments of the present invention.

In one embodiment, a method for additive manufacturing a component includes forming a first layer of the component by sintering at least a portion of a first bed of metal powder and collecting first physical property data of the first layer with a first sensor. Second physical property data of the first layer is collected with a second sensor. The method also includes forming a second layer of the component by sintering at least a portion of a second bed of metal powder disposed proximate the first layer. First physical property data of the second layer is collected with the first sensor and second physical property data of the second layer is collected with the second sensor. The method further includes aggregating the first physical property data of the first layer and the second layer of the component, and aggregating the second physical property data of the first layer and the second layer of the component. A model is calculated based on the aggregated first physical property data and the aggregated second physical property data from which to determine a potential failure mode in the component.

The method of the preceding paragraph can optionally include, additionally and/or alternatively, any one or more of the following features, configurations and/or additional components:

the first sensor is a high speed camera and the first physical property data is an intensity of a heat source that forms the first layer and the second layer;

the second sensor is a grayscale optical camera and the second physical property data comprises a geometry of sintered metal created by a laser beam or an electron beam during the formation of the first and second layers;

the second sensor is a thermal camera and the second physical property data comprises a size and shape of a melt pool formed by a laser beam or a electron beam in the first and second layers;

the second sensor is a fluid flow detector and the second physical property data comprises pressure differentials of a gas flow over both the first bed of metal powder and the second bed of metal powder;

a presence of airborne particulate over the first bed of metal powder and over the second bed of metal powder is determined from the pressure differentials of the gas flow of the second physical property data;

the second sensor comprises an ultrasonic emitter and ultrasonic receiver and the second physical property data comprises a density of the first bed of metal powder and a density of the second bed of metal powder; and/or the second physical property data is selected from the group consisting of crack presence, crack propagation, and combinations thereof.

In another embodiment, a system for additive manufacturing a component includes an additive manufacturing machine for building a component layer by layer and a first sensor configured to collect a first physical property data for each layer of the component as each layer is formed by the additive manufacturing machine. The system also includes a second sensor configured to collect a second physical property data for each layer of the component as each layer is formed by the additive manufacturing machine. A computing device is operatively connected to the first and second sensors and configured to receive the first physical property data and the second physical property data of the component and configured to compare the first physical property data with the second physical property data to determine a potential failure mode in the component.

The system of the preceding paragraph can optionally include, additionally and/or alternatively, any one or more of the following features, configurations and/or additional components:

the first sensor is selected from the group consisting of high speed cameras, grayscale optical cameras, thermal cameras, fluid flow detectors, gas analyzers, ultrasonic emitters, and ultrasonic receivers;

the second sensor is selected from the group consisting of high speed cameras, grayscale optical cameras, thermal cameras, fluid flow detectors, gas analyzers, ultrasonic emitters, and ultrasonic receivers;

a third sensor configured to collect a third physical property data for each layer of the component; and/or the third sensor is selected from the group consisting of high speed cameras, grayscale optical cameras, thermal cameras, fluid flow detectors, gas analyzers, ultrasonic emitters, and ultrasonic receivers.

In another embodiment, a method for additive manufacturing a component includes forming a first layer of the component by an additive manufacturing machine and collecting first physical property data of the first layer with a first sensor. Second physical property data of the first layer is collected with a second sensor. The first physical property data of the first layer and the second physical property data of the first layer are compared to inspect the first layer for a defect. The method further comprises forming a second layer of the component by the additive manufacturing machine and collecting first physical property data of the second layer with the first sensor. Second physical property data of the second layer is collected with the second sensor. The first physical property data of the second layer and the second physical property data of the second layer are compared to inspect the second layer for a defect. The first physical property data and the second physical property data of the first layer is aggregated with the first physical property data and the second physical property data of the second layer to form a model of the first physical property and the second physical property of the component. A potential failure mode in the component is determined based upon the model of the first physical property and the second physical property of the component.

The method of the preceding paragraph can optionally include, additionally and/or alternatively, any one or more of the following steps, features, and/or configurations:

inputting into the additive manufacturing machine at least one control parameter prior to forming the first layer;

the at least one control parameter is selected from the group comprising laser power of the additive manufacturing machine, electron beam power of the additive manufacturing machine, powder grain size distribution of a powder bed formed by the additive manufacturing machine, powder chemistry of the powder bed, gas flow across a surface of the powder bed, purity of the gas flow, speed of the laser of the additive manufacturing machine, and speed of the electron beam of the additive manufacturing machine;

adjusting the at least one control parameter based upon both the first physical property data of the first layer collected by the first sensor and the second physical property data of the first layer collected by the second sensor prior to forming the second layer;

forming the second layer of the component based on the adjusting of the at least one control parameter; and/or the additive manufacturing machine is selected from the group consisting of direct metal laser sintering machines and electron beam sintering machines.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while system and method 10 has been described in the Specification as including first sensor 34, second sensor 36, and third sensor 38, system and method 10 can include additional sensors. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for additive manufacturing a component, the method comprising:
    forming a first layer of the component by sintering at least a portion of a first bed of metal powder;
    collecting first physical property data of the first layer with a first sensor;
    collecting second physical property data of the first layer with a second sensor;
    forming a second layer of the component by sintering at least a portion of a second bed of metal powder disposed proximate the first layer;
    collecting first physical property data of the second layer with the first sensor;
    collecting second physical property data of the second layer with the second sensor;
    aggregating the first physical property data of the first layer and the first physical property data of the second layer of the component to calculate a first submodel of the first and second layers;
    aggregating the second physical property data of the first layer and the second physical property data of the second layer of the component to calculate a second submodel of the first and second layers; and
    calculating a model based on the first submodel and the second submodel from which to determine a potential defect in the component; and
    wherein the first sensor is a high speed camera and the first physical property data is an intensity of a heat source that forms the first layer and the second layer, and
    wherein the second sensor comprises an ultrasonic emitter and ultrasonic receiver and the second physical property data comprises a density of the first bed of metal powder and a density of the second bed of metal powder.

2. The method of claim 1, wherein the second sensor comprises a grayscale optical camera and the second physical property data comprises a geometry of sintered metal created by a laser beam or an electron beam during the formation of the first and second layers.

3. The method of claim 1, wherein the second sensor comprises a thermal camera and the second physical property data comprises a size and shape of a melt pool formed by a laser beam or an electron beam in the first and second layers.

4. The method of claim 1, wherein the second sensor comprises a fluid flow detector and the second physical property data comprises pressure differentials of a gas flow over both the first bed of metal powder and the second bed of metal powder.

5. The method of claim 4, wherein a presence of airborne particulate over the first bed of metal powder and over the second bed of metal powder is determined from the pressure differentials of the gas flow of the second physical property data.

6. The method of claim 1, wherein the second physical property data is selected from the group consisting of crack presence, crack propagation, and combinations thereof.

7. A method for additive manufacturing a component, the method comprising:
    forming a first layer of the component by an additive manufacturing machine;
    collecting first physical property data of the first layer with a first sensor;
    collecting second physical property data of the first layer with a second sensor;
    comparing the first physical property data of the first layer and the second physical property data of the first layer to inspect the first layer for a defect;
    forming a second layer of the component by the additive manufacturing machine;
    collecting first physical property data of the second layer with the first sensor;
    collecting second physical property data of the second layer with the second sensor;
    comparing the first physical property data of the second layer and the second physical property data of the second layer to inspect the second layer for a defect;
    aggregating the first physical property data and the second physical property data of the first layer with the first physical property data and the second physical property data of the second layer to form a three-dimensional model of the first physical property and the second physical property of the component; and
    determining a potential defect in the component and the three-dimensional extent of the defect in the component based upon the three-dimensional model of the first physical property and the second physical property of the component and
    wherein the first sensor is a high speed camera and the first physical property data is an intensity of a heat source that forms the first layer and the second layer, and
    wherein the second sensor comprises an ultrasonic emitter and ultrasonic receiver and the second physical property data comprises a density of the first bed of metal powder and a density of the second bed of metal powder.

8. The method of claim 7, wherein the method further comprises:
    inputting into the additive manufacturing machine at least one control parameter prior to forming the first layer.

9. The method of claim 8, wherein the at least one control parameter is selected from the group consisting of laser power of the additive manufacturing machine, electron beam power of the additive manufacturing machine, powder grain size distribution of a powder bed formed by the additive manufacturing machine, powder chemistry of the powder bed, gas flow across a surface of the powder bed, purity of the gas flow, speed of the laser of the additive manufacturing machine, and speed of the electron beam of the additive manufacturing machine.

10. The method of claim 8, wherein the method further comprises:
    adjusting the at least one control parameter based upon both the first physical property data of the first layer collected by the first sensor and the second physical property data of the first layer collected by the second sensor prior to forming the second layer.

11. The method of claim 10, wherein the method further comprises:
  forming the second layer of the component based on the adjusting of the at least one control parameter.

12. The method of claim 7, wherein the additive manufacturing machine is selected from the group consisting of direct metal laser sintering machines and electron beam sintering machines.

\* \* \* \* \*